(No Model.) 2 Sheets—Sheet 1.
J. B. OKEY.
BICYCLE.
No. 496,093. Patented Apr. 25, 1893.
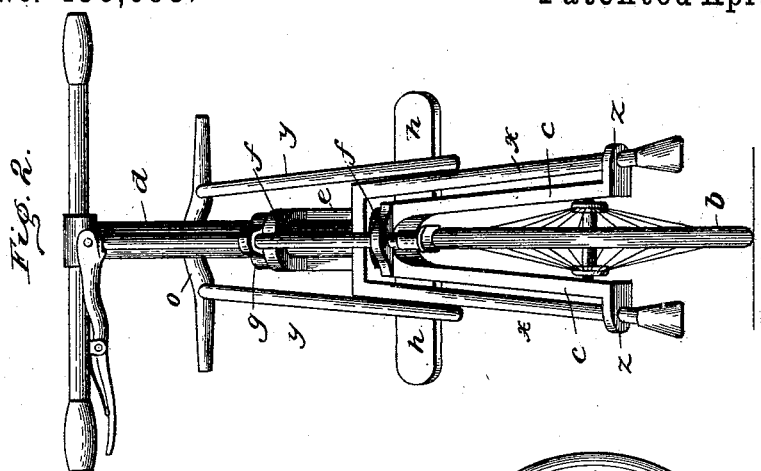
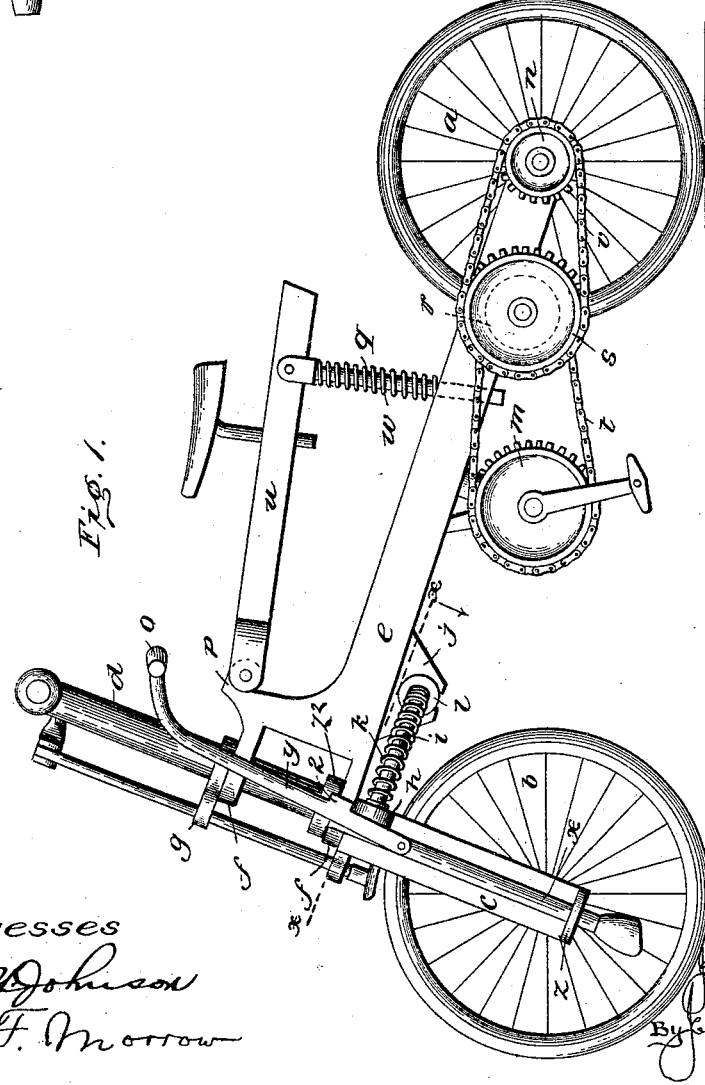
Witnesses
Guy A. Johnson
W. F. Morrow
Inventor
Joseph B. Okey
By Johnson & Johnson
his Attorneys.

(No Model.) 2 Sheets—Sheet 2.
J. B. OKEY.
BICYCLE.
No. 496,093. Patented Apr. 25, 1893.
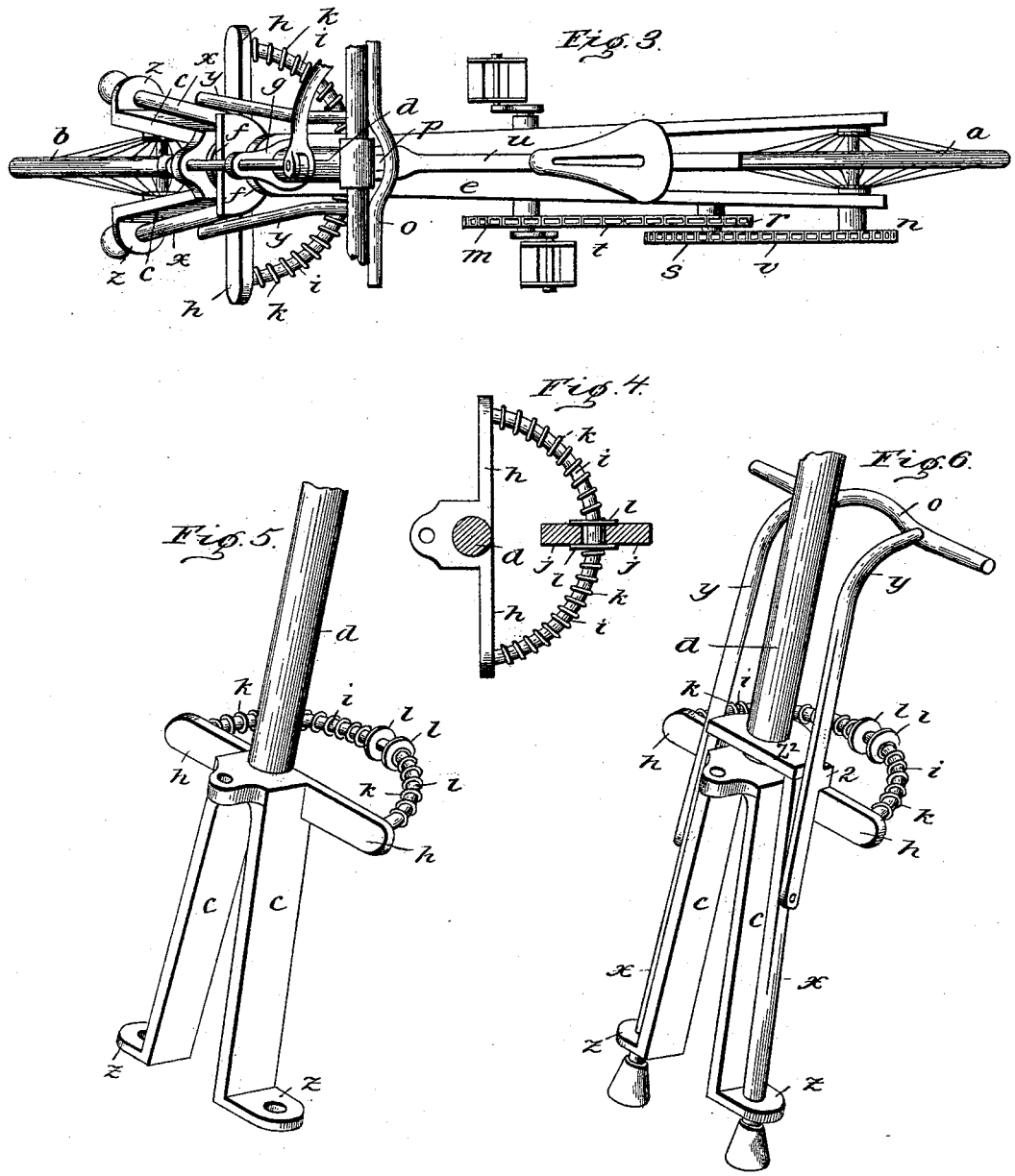
Witnesses
Geo. H. Johnson
W. F. Morrow
Inventor
Joseph B. Okey
By Johnson & Johnson
his Attorneys.

UNITED STATES PATENT OFFICE.

JOSEPH B. OKEY, OF INDIANAPOLIS, INDIANA, ASSIGNOR OF ONE-HALF TO JAMES C. HASSEY, OF SAME PLACE.

BICYCLE.

SPECIFICATION forming part of Letters Patent No. 496,693, dated April 25, 1893.

Application filed October 11, 1892. Serial No. 448,546. (No model.)

*To all whom it may concern:*

Be it known that I, JOSEPH B. OKEY, a citizen of the United States, and a resident of Indianapolis, in the county of Marion and State of Indiana, have invented certain new and useful Improvements in Bicycles, of which the following is a specification.

My invention is directed to improvements in bicycles of the type known as the "safety;" and my said improvements consist of certain novel parts, constructions and combinations of parts particularly pointed out in the claims concluding this specification.

The annexed drawings show a bicycle embodying the several features of my said invention, wherein—

Figure 1, shows a side view of the bicycle. Fig. 2 is a front view; and Fig. 3 is a top view of the same. Fig. 4 is a horizontal sectional view taken on the line $x$—$x$ of Fig. 1 showing the governor device. Fig. 5 shows the steering-fork and its spring governor in perspective; and Fig. 6 shows the steering-fork and its connected prop in perspective.

The wheels are preferably of equal or approximately equal size and the rear one $a$ is the driver, and the front one $b$ is the steering-wheel, which is mounted in a fork $c$, which also forms the steering-post $d$ and has the transverse handle-bar.

The frame is formed of a single-bar $e$ at the rear divided end of which the drive-wheel is mounted, its front end being divided to form bearing arms $f$ by which it is pivotally connected to the steering-post between a fixed lug $g$ thereon and the top of the fork. Under the lower frame-bearing-arm $f$, the fork has a cross-bar, or is formed with horizontal arms $h$ on each side, to the ends of which a bow or semi-circular rod $i$ is secured and extends to the rear between the front wheel and the frame-bar. This frame-bar has a flange or lug $j$ preferably formed on its under side with an opening or deep notch to receive the bow to form a connection with the frame-bar and permit the bow to move therein as the fork is turned. On the bow are placed two coil-springs $k\ k$ of equal tension, which at their inner or meeting ends abut against the opposite sides of the flange or lug $j$, their outer ends abutting against the arms $h\ h$, of the fork and thereby serve as a governor to maintain the steering-wheel in its normal or straight line when the rider has his hands off the steering-handle. It also serves to hold the front wheel from turning to the right or to the left as its tendency is to do, and thereby renders the bicycle more easy and safely governed.

At their inner ends the springs rest against washers $l, l$ fitted loosely on the bow to give a proper bearing for the springs upon the bar-flange. The arrangement of the fork-bow and the springs upon the latter gives the advantage of allowing the direct action of separate springs upon the fork-arms and an equal pressure thereon and upon the frame-bar, so that in turning the wheel the springs will act independently of each other, the spring in action being compressed while the other spring retains its normal state.

I provide a duplex driving mechanism for the chain-gear for increasing the speed of the drive-wheel by a single pedal-driver. A bracket or stud depending from the frame-bar carries the pedal-crank-axle and sprocket-wheel $m$, and the drive-wheel has the usual sprocket-wheel $n$, and between these a double sprocket-wheel $r$ and $s$ is mounted on a stud of the frame-bar. These wheels I prefer to have of unequal diameter in pairs, the treadle-wheel being about twice the diameter of its connected intermediate wheel $r$, and the intermediate wheel $s$, being about twice the diameter of its connected wheel on the axle of the drive-wheel. This gives two chain connections from one treadle-shaft, so that the speed of the motion imparted from the treadle-chain $t$ is very considerably increased by the drive-wheel connecting chain $v$ due to the unequal diameters of the connecting wheels.

The support for the seat or saddle is formed by a bar $u$ pivoted to a lug $p$ on the upper arm of the frame-bar, and rests at its rear end upon a stud or stem $q$ to which it is pivoted and which passes through a guide opening in the frame-bar and has a coil spring $w$, which, resting upon the latter, forms a cushion for the seat-support. The pivoted guide-stem passing through the frame-bar forms a very firm and easy spring seat-support and permits the use of any suitable saddle on the bar.

For holding the bicycle in position when it is at a stand still I provide a prop at the steering-fork. I make the prop of two legs $x, x$ in the form of a yoke, each leg being fitted in guides $z\ z$ at each side of and at the lower ends of the fork, said guides being preferably made in the outwardly bent ends of the fork and in the cap-plate $z^2$ thereof fitted on the steering-post so that the legs straddle the fork and are therefore centrally on each side of the steering wheel. The yoke-prop is raised and held up out of the way and depressed and held down upon the ground by a handle yoke $y$ pivoted to the prop-legs and terminating in a handle $o$ above the latter, at the rear side of the steering-post. Each side of the handle-yoke, has a stop or projection 2—2, which stand to the rear and when the prop is pressed down on the ground engage the under sides of the arms $h, h$ at the top of the fork and lock the prop-legs to the latter, and thereby support the bicycle when at a stand still. When the prop is raised, the said projections 2, 2 are brought up over the said fork-arms and resting thereon hold the prop up out of the way. The raising and depressing of the prop are effected by the handle-yoke, and the engagement and disengagement of the latter with the fork-arms are effected by moving the handle yoke to the front to release the engagement and by pulling it to the rear to make said engagement. For this purpose the pivoted ends of the handle-yoke stand in front of the fork-arms, while its handle stands in the rear of the steering-post. This position of the handle-yoke is just below the steering-bar and in front of the rider so that he can operate the prop at the moment of starting and stopping. As the handle of the yoke stands to the rear of the steering-post, its gravity tends to and does hold its stops in engagement with the fork-arms, and this whether the fork be raised or lowered so that the handle-yoke needs no fastening device to maintain its engagement with the fork-arms. In addition to this gravity action of the prop operating handle-yoke I prefer that the steering-fork, the prop and its operating handle-yoke stand together obliquely rearward, so that the handle-yoke rests by gravity against the front sides of the fork-arms, being pivoted to the fork below said arms. This construction provides the steering-fork with a governor and with a prop in compact relation and both under the control of the operator's hands.

The bicycle is provided with the usual brake for the front wheel; and the arms $h\ h$ form the foot rests.

I claim as my improvements—

1. In a bicycle, the fork having horizontal side arms at its upper end, and a steering-post above said arms, in combination with a divided prop mounted for vertical adjustment on the fork, and a yoke-handle pivoted to the legs of said prop, in front of the arms of the fork, terminating in a handle in front of the steering-post and having lugs or projections between its ends, adapted to engage the arms of the fork to hold the prop in or out of use, substantially as described.

2. In a bicycle, the combination, with the steering-fork, of a divided prop mounted in suitable guides thereon and a divided handle pivoted upon said prop, standing obliquely rearward, terminating in a handle in rear of the fork and adapted to maintain its engagement with the fork by gravity to hold the prop up or down, substantially as described.

3. In a bicycle, the combination, with a fork having its lower ends turned out to form guides, the arms crossing above the front wheel, at each side, and the steering post above said arms, of the prop legs passing through said fork ends and sliding upon said post between the frame bearings, and a lifting and depressing handle pivoted to the prop-legs below and in front of said fork arms and having lugs or projections adapted to engage the upper and the lower edges of said arms, and maintain such engagement by gravity, the said frame bearings limiting the vertical movement of the prop to bring its handle lugs above and below said fork-arms substantially as described.

4. In a bicycle, the combination with the steering fork having horizontal cross-arms, of a divided prop movable in guides on said fork, and a divided handle pivoted to the outer vertical sides of said prop in position to tilt rearward at its upper end and provided with means for engaging said fork-arms, such engagement being maintained by the automatic gravity tilting action of said handle, substantially as described.

In testimony whereof I have hereunto signed this specification in the presence of witnesses.

JOSEPH B. ✕ OKEY.
his  mark

Witnesses:
GEORGE W. BAILEY,
JAMES W. REDMON.